United States Patent [19]
Morikawa et al.

[11] Patent Number: 5,539,463
[45] Date of Patent: Jul. 23, 1996

[54] CASSETTE EJECT MECHANISM, BATTERY LOADING MECHANISM AND MECHANICAL CHASSIS SUPPORTING MECHANISM

[75] Inventors: Masayoshi Morikawa, Kanagawa; Yoshitaka Matsumoto; Hisao Shirokoshi, both of Aichi; Naoki Funakoshi, Tokyo, all of Japan

[73] Assignee: Sony Corporation, Tokyo, Japan

[21] Appl. No.: 293,919

[22] Filed: Aug. 22, 1994

[30] Foreign Application Priority Data

Aug. 24, 1993 [JP] Japan .................................. 5-209624
Aug. 24, 1993 [JP] Japan .................................. 5-209625
Aug. 24, 1993 [JP] Japan .................................. 5-209626

[51] Int. Cl.⁶ .................................................... H04N 5/225
[52] U.S. Cl. ............................................ 348/375; 348/374
[58] Field of Search ..................................... 348/372, 373, 348/374, 375, 376; 354/74, 275; H04N 5/225, 5/222

[56] References Cited

U.S. PATENT DOCUMENTS

| | | | |
|---|---|---|---|
| 4,885,643 | 12/1989 | Ichimura et al. | 348/373 |
| 5,121,268 | 6/1992 | Nakayama et al. | 360/71 |
| 5,130,804 | 7/1992 | Tamura et al. | 348/374 |

FOREIGN PATENT DOCUMENTS

| | | | |
|---|---|---|---|
| 0393647 | 10/1990 | European Pat. Off. | G11B 25/06 |
| 0401475 | 12/1990 | European Pat. Off. | G11B 23/28 |
| 0522330 | 1/1992 | European Pat. Off. | G11B 31/00 |
| 62-105579 | 5/1987 | Japan | H04N 5/225 |
| 4-365270 | 12/1992 | Japan | H04N 5/225 |
| 5-41825 | 2/1993 | Japan | H04N 5/225 |
| 5-260354 | 10/1993 | Japan | H04N 5/225 |

*Primary Examiner*—Wendy Greening
*Assistant Examiner*—Tuan V. Ho
*Attorney, Agent, or Firm*—William S. Frommer; Alvin Sinderbrand

[57] ABSTRACT

A cassette eject mechanism for a recording or reproducing apparatus can remove a cassette eject button from a housing and can reliably eject a tape cassette only when a tape cassette should be loaded or unloaded. A battery loading mechanism for an electronic equipment can make the loading of battery simple and reliable, and becomes easy to handle. The locking mechanism can be simplified in structure so that the number of assembly parts can considerably be reduced. Further, a mechanical chassis supporting mechanism in a recording apparatus is for use with an apparatus in which a mechanical chassis or cabinet can be reduced in thickness. According to this mechanical chassis supporting mechanism, it is possible to prevent an external stress from being applied to the mechanical chassis as a twisting deform force.

7 Claims, 13 Drawing Sheets

CASSETTE EJECT MECHANISM, BATTERY LOADING MECHANISM AND MECHANICAL CHASSIS SUPPORTING MECHANISM

BACKGROUND OF THE INVENTION

The present invention relates to a cassette eject mechanism of a recording or reproducing apparatus for use with a so-called single unit video camera-recorder having a camera function and a recording or reproducing function. Further, the present invention relates to a battery loading mechanism used in such single-unit video camera-recorder or electronic equipment, such as a liquid crystal television receiver or the like. Furthermore, the present invention relates to a mechanical chassis (mechanical deck) supporting mechanism for use in a recording apparatus.

Single-unit video camera-recorders are now commercially available on the market. The single unit video camera-recorder needs various operations buttons provided on the housing to take a picture and various operation switch buttons to record a video signal or to reproduce a recorded video signal. Of the above-mentioned operation switch buttons, the single-unit video camera-recorder needs cassette eject buttons disposed on the housing to perform the recording or reproduction.

Since the single-unit video camera-recorder has many operation switches disposed on its housing as described above, the user tends to operate a wrong operation switch button unintentionally. Therefore, the single-unit video camera-recorder has an image that it is not so easy for the user to handle.

Of the various operation switch buttons, if the user operates the cassette eject button inadvertently, there is then the problem that a tape cassette is ejected from the single-unit video camera-recorder to interrupt the recording or reproducing operation during the recording or reproduction. Therefore, when the single-unit video camera-recorder is used outdoors, from a portability standpoint, the single-unit video camera-recorder has various mechanical restrictions, such as where to dispose a cassette eject button and how to provide a cassette eject button locking mechanism.

Electronic equipments generally include a rechargeable battery accommodating mechanism portion provided on a housing thereof. The rechargeable battery accommodating mechanism portion generally comprises a battery accommodating portion for accommodating a rechargeable battery, a lid cover supported to the battery accommodating portion so as to become freely openable and closable and a locking mechanism for positioning the rechargeable battery accommodated in the battery accommodating portion.

The battery accommodating mechanism portion, however, encountered with the problems such that it is difficult to load the rechargeable battery into the battery accommodating portion and that the loading of the rechargeable battery is hard to understand. Further, since the locking mechanism for positioning the battery in the battery accommodating portion is complicated in structure, the number of assembly parts is unavoidably increased. There is then the problem that the assembling of the battery mechanism portion is troublesome for the user. Furthermore, since the battery mechanism portion is disposed on the electronic equipment at its very restricted place, the battery mechanism portion tends to be restricted from a plan or design standpoint. Therefore, it is unavoidable that the electronic equipment is deteriorated in outer face.

A recent trend of a recording apparatus is that the recording apparatus is more and more miniaturized and reduced in weight. In accordance with this trend, a mechanical chassis on which important mechanism portions of the recording apparatus are mounted or a cabinet forming an outer housing of the recording apparatus is reduced in thickness in order to reduce the weight thereof.

While the mechanical chassis or the cabinet can be reduced in weight when it is reduced in thickness, a rigidity (strength) thereof is lowered unavoidably. For this reason, the mechanical chassis or cabinet tends to be deformed by an external stress, such as a twisting force or the like. An important problem caused when the mechanical chassis or cabinet is deformed by the twisting force or the like is that an accurate tape path cannot be formed on a drum by a very small displacement produced between tape path mechanisms provided on the mechanical chassis.

SUMMARY OF THE INVENTION

It is, therefore, an object of the present invention to provide a cassette eject mechanism for a recording or reproducing apparatus in which a cassette eject button can be removed from a housing and in which a cassette eject operation can reliably be carried out only when a tape cassette should be loaded or unloaded.

It is another object of the present invention to provide a rechargeable battery loading mechanism for an electronic equipment onto which a rechargeable battery can be loaded with ease.

It is still another object of the present invention to provide a battery loading mechanism for an electronic equipment which can become easy to handle.

It is still another object of the present invention to provide a battery loading mechanism in which a locking mechanism can be simplified in structure and in which the number of assembly parts can be reduced considerably.

It is a further object of the present invention to provide a mechanical chassis supporting mechanism for a recording apparatus in which an external stress can be prevented from being applied to a thin mechanical chassis or a cabinet as a twisting deformation force.

According to a first aspect of the present invention, there is provided a cassette eject mechanism for a recording or reproducing apparatus which comprises a main body portion having a cassette compartment disposed therein, a lid portion supported to the main body portion by means of a hinge portion so as to become openable and closable about the hinge portion, a pair of guide arms supported on the lid portion to assist the lid portion to be opened and closed relative to the main body portion, wherein a cassette eject switch is operated in a ganged relation to an opening operation of the lid portion.

According to a second aspect of the present invention, there is provided a battery loading mechanism for an electronic equipment which comprises a battery accommodating concave portion provided on a housing of the electronic equipment, a lid portion provided on the housing so as to become openable and closable about a hinge portion relative to the battery accommodating concave portion, and positioning means for positioning a battery to a loading position of the battery accommodating concave portion in a ganged relation to a closing operation of the lid portion.

In accordance with a third aspect of the present invention, there is provided a mechanical chassis supporting mechanism in a recording or reproducing apparatus which comprises a mechanical chassis having a cassette compartment mounted thereon, supporting members respectively supported on the mechanical chassis on its drum side and on its opposite side of the drum side in the rear surface of the mechanical chassis, an outer housing for supporting the mechanical chassis through the two supporting members, and supporting means in which the supporting member on the drum side is supported to the mechanical chassis by a one screw in a one-point supporting fashion and the supporting member on the opposite side of the drum side is supported to the mechanical chassis by two screws in a two-point fashion.

DETAILED DESCRIPTION OF THE PREFERRED EMBODIMENTS

A cassette eject mechanism of a recording or reproducing apparatus according to a first embodiment of the present invention will be described with reference to the drawings, in which case the cassette eject mechanism according to the present invention is applied to a single-unit video camera-recorder.

Figure 1:
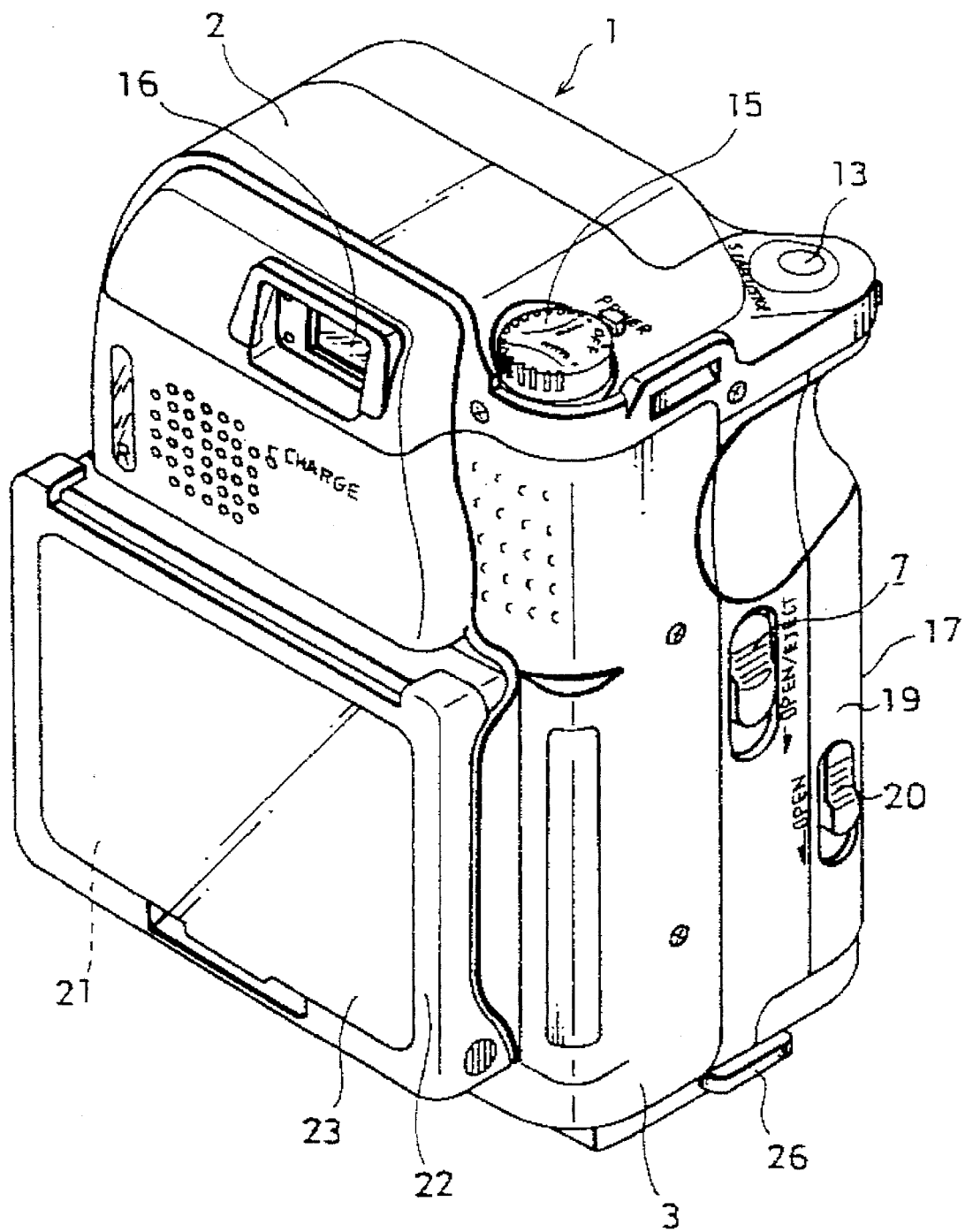
FIG. 1 is a perspective view showing a single-unit video camera-recorder according to a first embodiment of the present invention from the rear surface thereof.
Figure 2:
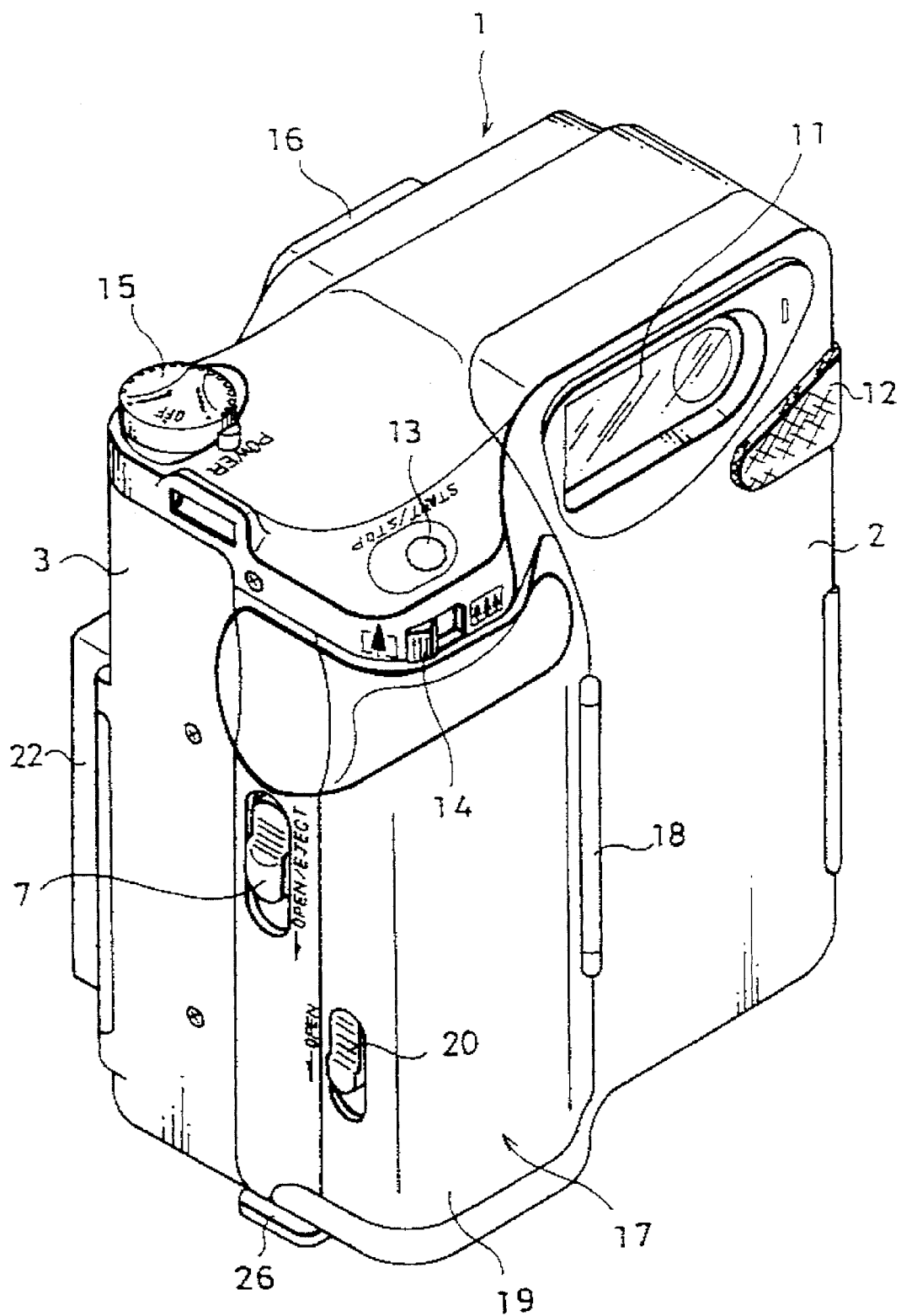
FIG. 2 is a perspective view showing the single-unit video camera-recorder according to the first embodiment of the present invention from the front surface thereof.
Figure 3:
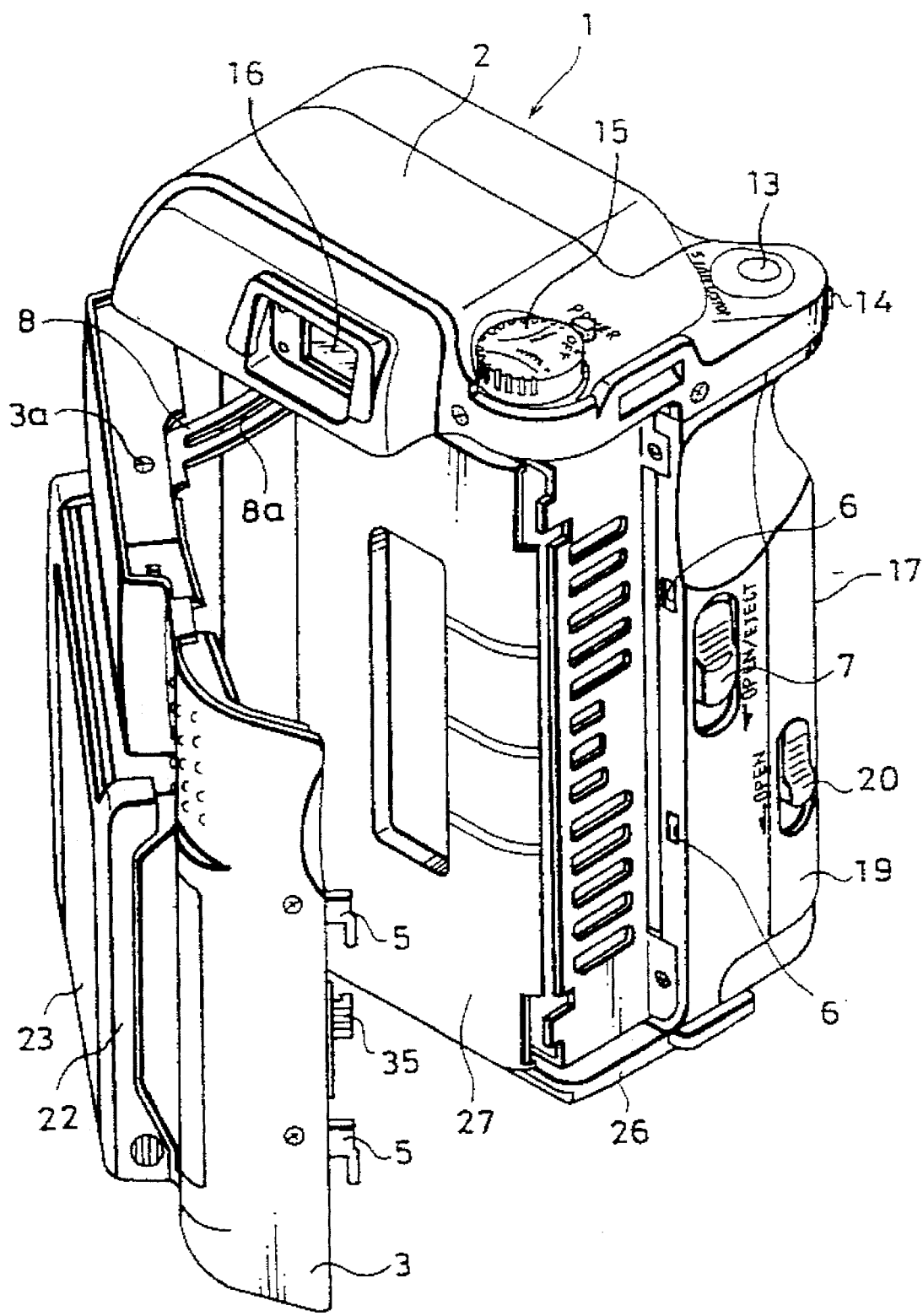
FIG. 3 is a perspective view of the single-unit video camera-recorder according to the embodiment of the present invention under the condition that a lid portion thereof is opened.
Figure 4:
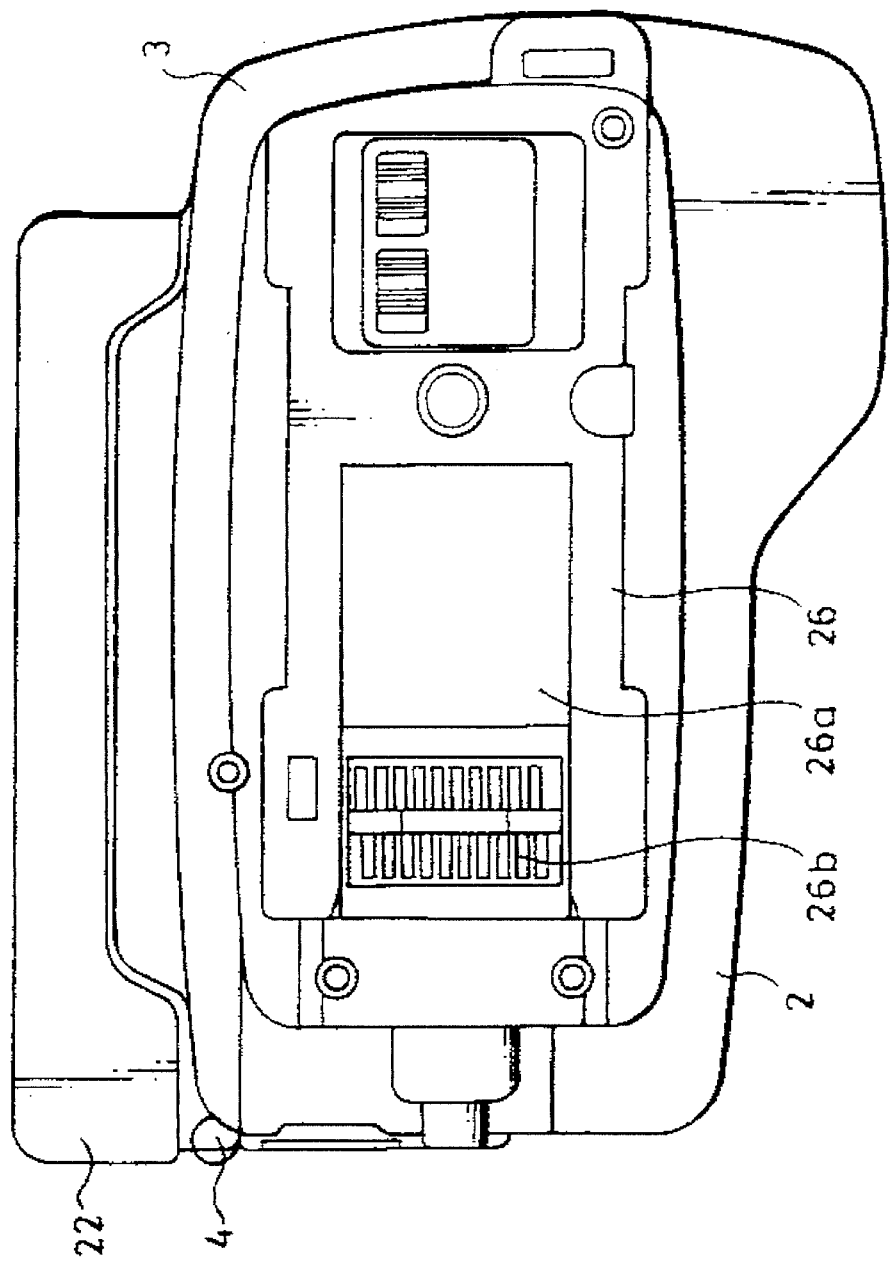
FIG. 4 is a bottom view of the single-unit video camera-recorder according to the first embodiment of the present invention.
Figure 5:
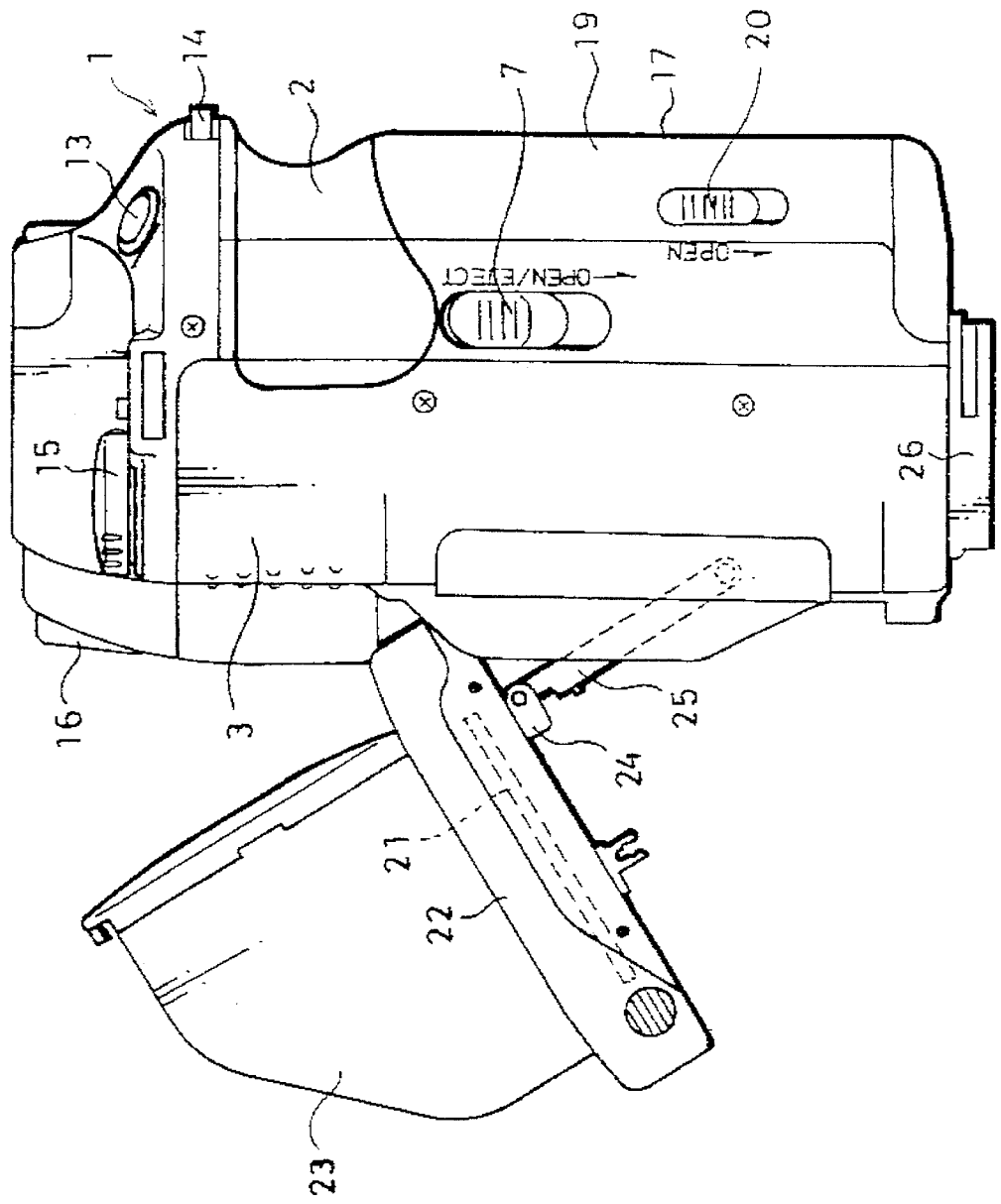
FIG. 5 is a side view of the single-unit video camera recorder according to the first embodiment of the present invention.
Figure 6:
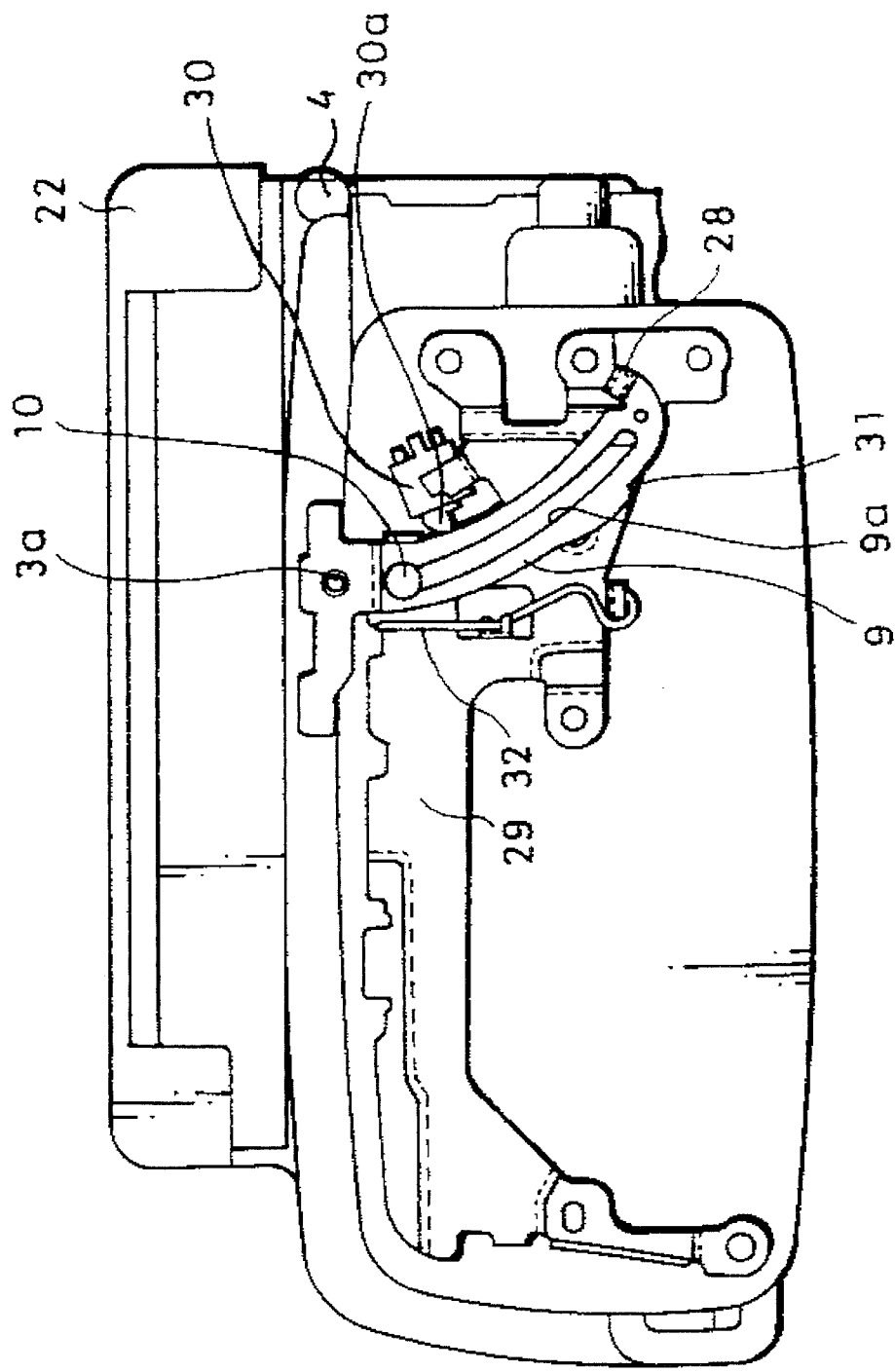
FIG. 6 is a plan view of a cassette eject mechanism used in the single-unit video camera-recorder according to the present invention.

FIG. 1 of the accompanying drawings is a perspective view showing an outer face of a single-unit video camera-recorder according to a first embodiment of the present invention from the rear surface thereof. FIG. 2 is a perspective view showing an outer face of the same single-unit video camera-recorder from the front surface thereof. FIG. 3 is a perspective view showing the same single-unit video camera-recorder with its lid portion opened. FIG. 4 is a bottom view of the same single-unit video camera-recorder. FIG. 5 is a side view of the same single-unit video camera-recorder presented when in use. FIG. 6 is a plan view showing the cassette eject mechanism used in the single-unit video camera-recorder according to the present invention.

As illustrated, a single-unit video camera-recorder according to the present invention is generally depicted by reference numeral 1. Initially, main portions of the single-unit video camera-recorder 1 will be described below. As illustrated, a casing or housing of the single-unit video camera-recorder 1 comprises a main body portion 2 and a lid portion 3. The lid portion 3 is openably and closably supported to the main body portion 2 by a hinge portion 4. The lid portion 3 is closed when levers 5, 5 provided on open end of the other side portion are locked into engagement holes 6, 6 bored through the end portion of the main body portion 2. The lid portion 3 can be released from the locked state by sliding a lid lock releasing slide bar 7 and can be opened.

The lid portion 3 that can be rotated about the hinge portion 4 relative to the main body portion 2 includes a pair of upper and lower guide arms 8, 9 of arcuate configuration rotatable about the hinge portion 4 fixed thereto by screws 3a, 3a. The two guide arms 8, 9 includes guide slots 8a, 9a of proper shapes with which guide pins 10 (shown only in FIG. 6) provided on the main body portion 2 side are engaged, thereby assisting the lid portion 3 to be opened and closed.

As shown in FIG. 2, a lens window 11 of a camera portion is provided on the upper portion of the front wall of the main body portion 2. A sound collecting portion 12 is provided near the lens window 11. The main body portion 2 includes a camera mode start/stop button 13 provided on the upper one side thereof. A switching lever 14 is provided near the start/stop button 14 to switch a wide angle mode and a telephoto mode of the camera portion. A camera mode and video mode switching operation dial 15 is provided on the upper portion of another one side of the main body portion 2. As shown in FIG. 1, a viewfinder 16 is provided on the upper rear surface portion of the main body portion 2.

The main body portion 2 includes a battery accommodating portion 17 formed on one side portion of the front wall thereof. The battery accommodating portion 17 comprises an accommodating concave portion (not shown) formed on the main body portion 2 and a lid portion 19 supported openable and closable to the main body portion 2 by means of a hinge portion 18. The lid portion 19 can be opened by sliding a lock releasing slide button 20.

The lid portion 3 includes on its rear wall formed a liquid crystal display portion 21 which can display a picture to be monitored as shown in FIG. 1. As shown in FIG. 1, the liquid crystal display portion 21 is held by a frame 22 and the frame 22 includes an openable and closable hood 23 of a foldable type. The user can watch the liquid crystal display portion 21 by spreading the hood 23 as shown in FIG. 5.

The frame 22 is pivotally supported at its upper end portion to the lid portion 3 by means of a hinge metal fitting 24. An angle of the frame 22 can be changed by an ancillary arm 25 as shown in FIG. 5. Therefore, the cameraman can take a picture while watching the liquid crystal display portion 21 under the condition that the liquid crystal display portion 21 is set at a desired angle by rotating the frame 22 in adjustment.

The main body portion 2 includes on its bottom wall provided a supporting plate 26 which can electrically connect the single-unit video camera-recorder 1 to a station (not shown) as shown in FIG. 4. The supporting plate 26 is composed of an openable and closable shutter 26a and a terminal block 26b disposed on the inside of the shutter 26a. The above-mentioned station is a connection apparatus that enables information recorded by the single-unit video camera-recorder to be recorded and reproduced by a television receiver or to be dubbed by other VTR.

The main body portion 2 includes a cassette compartment 27 of a recording or reproducing apparatus provided therein. The cassette compartment 27 is not related to a gist of the present invention and therefore need not be described herein. The lid portion 3 can be served as a cassette lid of the cassette compartment 27. The cassette compartment 27 can eject the tape cassette in a so-called linear skate fashion.

Figure 7:
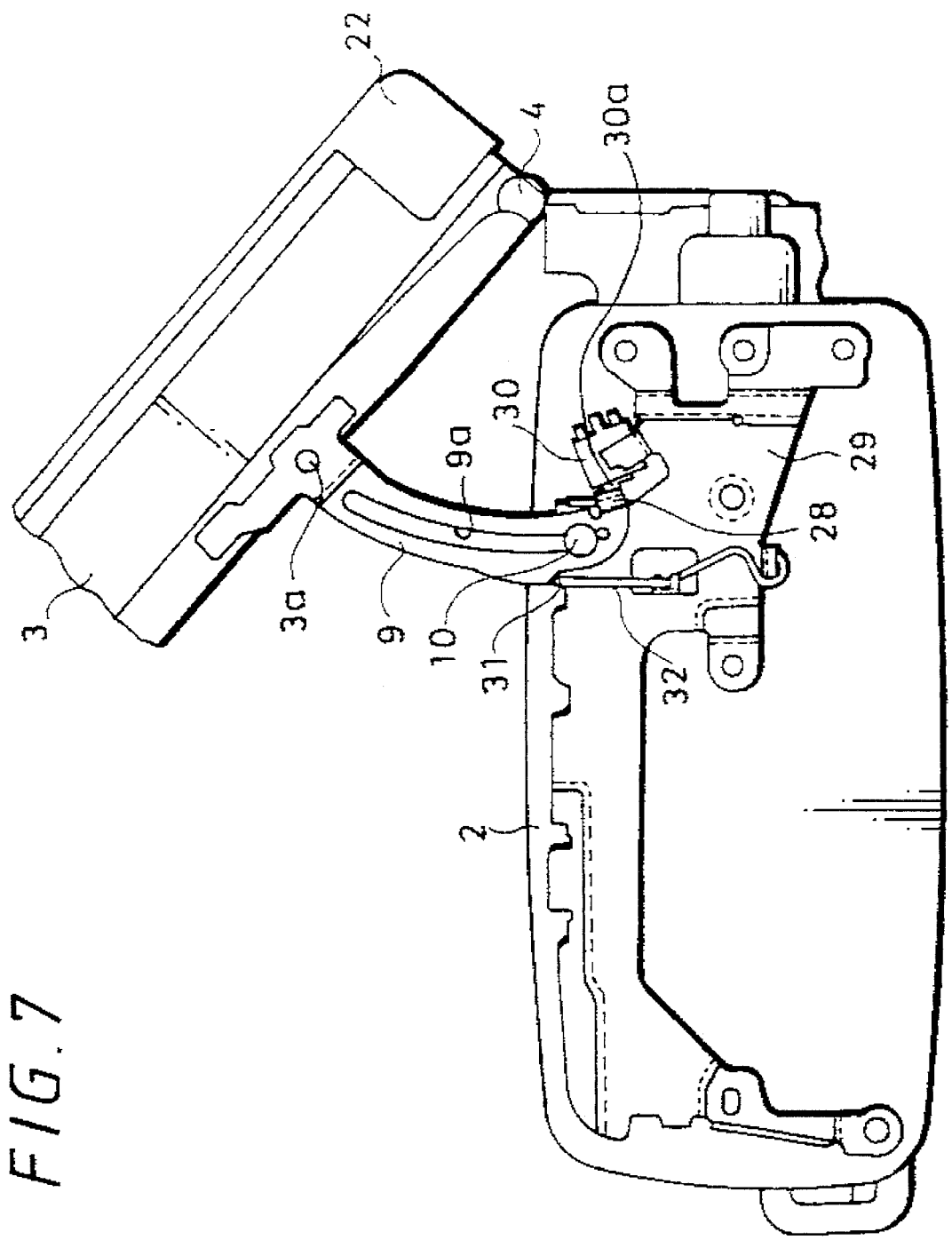
FIG. 7 is a diagram showing the operated state of the cassette eject mechanism of the single-unit video camera-recorder according to the first embodiment of the present invention.

A cassette eject mechanism of the cassette compartment 27 and which is the gist of the present invention will be described below with reference to FIGS. 6 and 7. FIG. 7 shows the operated state of the cassette eject mechanism. Of the pair of guide arms 8, 9 which assist the lid portion 3 to open and close, the lower guide arm 9 includes an operation member 28 projected on its tip end portion. An eject switch 30 is disposed on the base plate 29 provided on the main body portion 2 side in response to the operation member 28. The eject switch 30 is electrically connected to a motor (not shown) for the eject operation of the cassette compartment 27.

The guide arm 9 includes an inclined stepped lock portion 31 formed on the opposite side of the side in which the operation member 28 is provided. The lock portion 31 faces a spring portion 32 supported to the base plate 29 and defines the locking mechanism.

According to the cassette eject mechanism of the present invention, when the lid portion 3 is opened, the operation member 28 of the guide arm 9 that moves together with the opening of the lid portion 3 pushes the projected member 30a of the eject switch 30 and actuates the eject switch 30. Therefore, the eject operation motor (not shown) of the cassette compartment 27 is driven and the cassette compartment 27 is operated in a linear skating fashion so that the tape cassette can be loaded onto and/or unloaded from the cassette compartment 27.

At the same time when the eject operation of the cassette compartment 27 is carried out by operating the eject switch 30 in synchronism with the close operation of the lid portion 3, the lock portion 31 of the guide arm 9 comes in engagement with a spring member 32, whereby the lid portion 3 is locked under the condition that it is opened at maximum. Therefore, the lid portion 3 maintains the maximum opened state and the lid portion 3 can be prevented from being closed recklessly so long as a large closing force is not applied thereto.

The lid portion 3 can be released from the locked state when the lock member 31 of the guide arm 9 passes the spring member 32 by a force in the closing direction. Simultaneously, the operation member 28 of the guide arm 9 is released from the projected member 30a of the eject switch 30 and the eject switch 30 is disabled so that the cassette compartment 27 is moved at the loading position in a ganged relation to the eject switch 30. Thereafter, the levers 5, 5 provided on the open end portion of the lid portion 3 are locked into the engagement holes 6, 6 bored through the main body portion 2 side, thereby the lid portion 3 being placed in the closed state.

Figure 8:
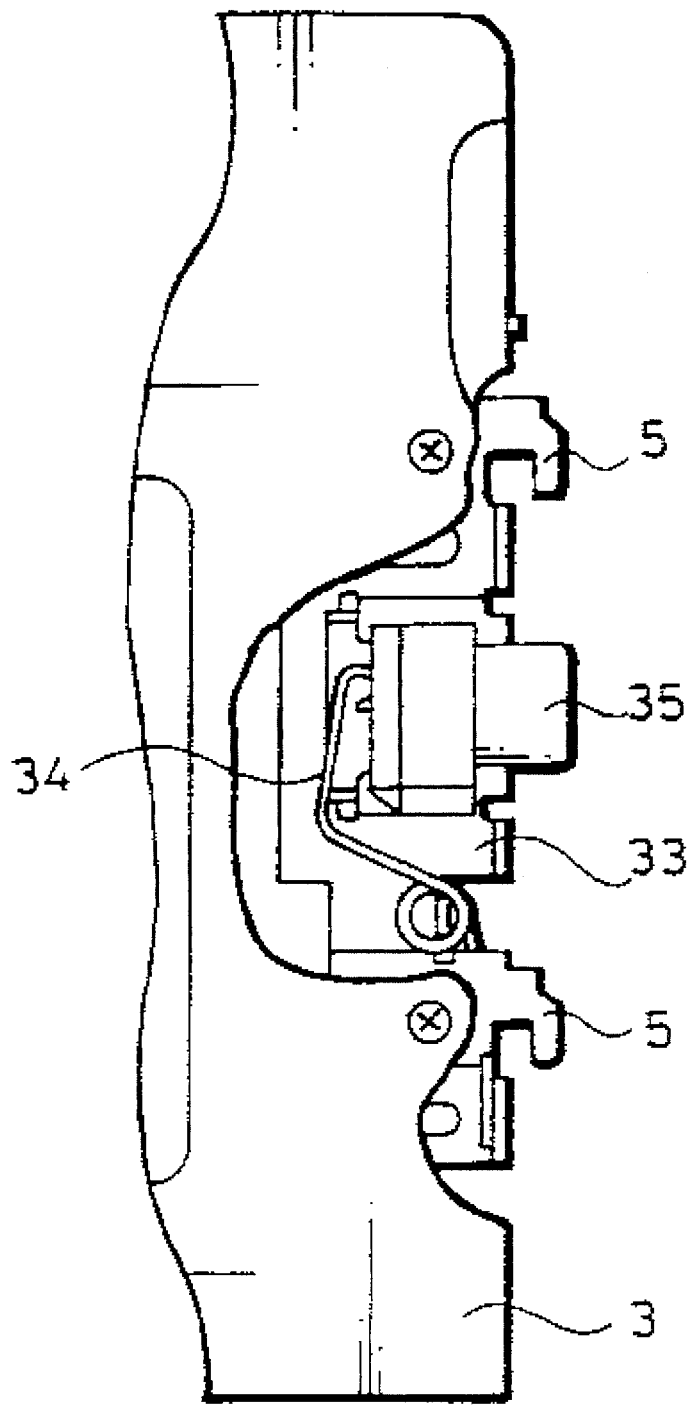
FIG. 8 is a front view of a lid pop-up mechanism according to the present invention.

On the other hand, the lid portion 3 includes a lid pop-up mechanism independently of the cassette eject mechanism. As shown in FIG. 8, this lid pop-up mechanism is composed of a frame 33 supported to the rear surface of the lid portion 3 at the intermediate position of the levers 5, 5 and a pop-up member 35 held to the lid portion 3 by a spring member 34 in the projected direction.

Specifically, under the condition that the lid portion 3 is in the closed state, the pop-up member 35 is urged against the end portion of the main body portion 2 against the spring force of the spring member 34. When the lid portion 3 is released from the locked state by operating the lid lock releasing slide switch 7, the lid portion 3 can be popped up under the spring force of the spring member 34 urged against the pop-up member 35.

As another action of the lid pop-up mechanism, it is possible to confirm that the lid portion 3 is not closed completely because the lid portion 3 is popped up by the pop-up member 35 if the lid portion 3 is not reliably locked when the lid portion 3 is being closed.

Figure 9:
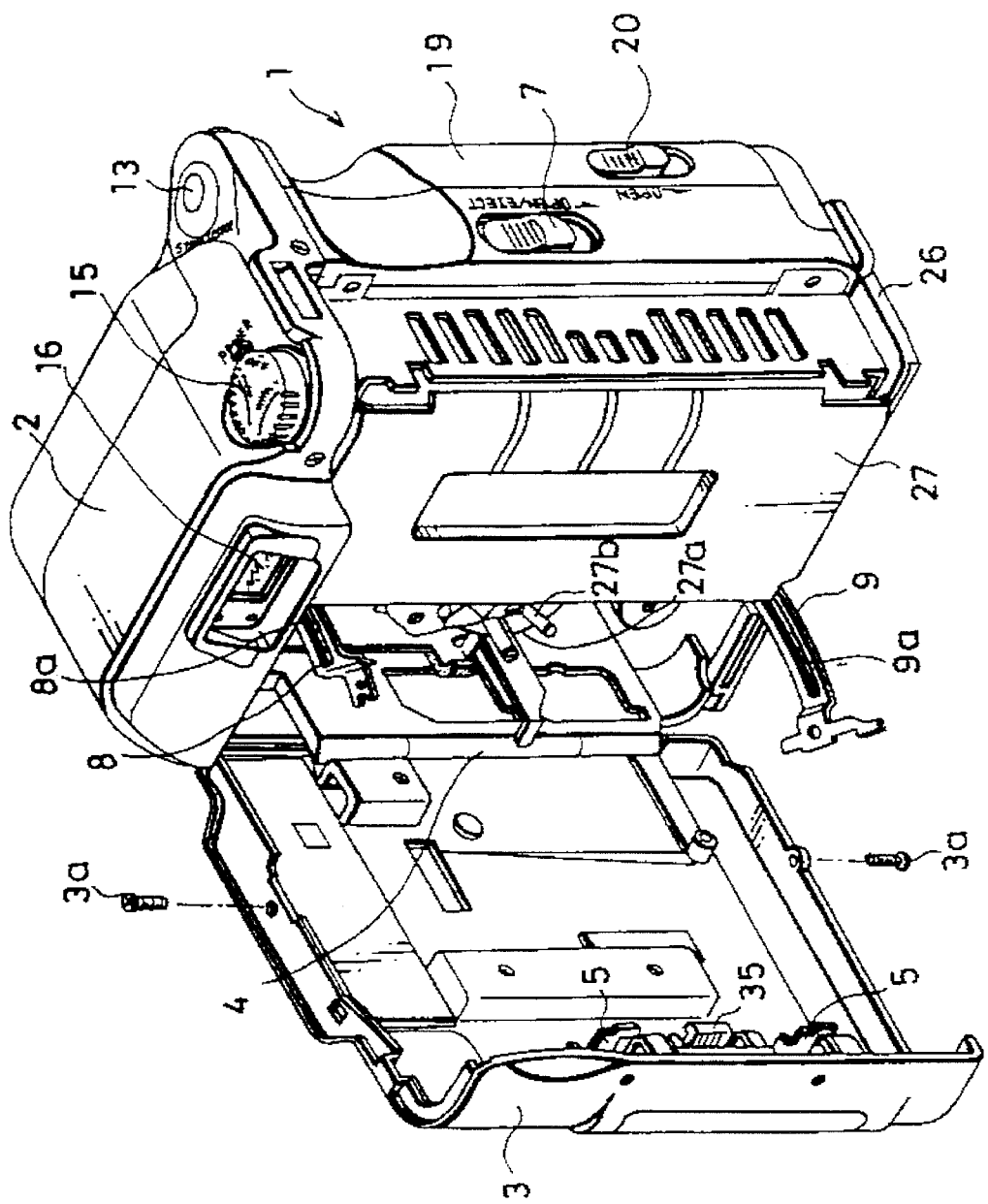
FIG. 9 is a perspective view of the single-unit video camera-recorder under the condition that a lid portion is opened.

The lid portion 3 can be rotated about the hinge portion 4 in the opening direction by removing the screws 3a, 3a which secured the guide frames 8, 9 to the lid portion 3, as shown in FIG. 9. Therefore, it is possible to repair and inspect the drum head 27a, such as cleaning of the drum head 27a or exchange the worn drum head 27a or to repair and inspect the tape path mechanism portion, such as cleaning of the tape guide system 27a of the tape path mechanism portion and a tape path adjustment with ease without disassembling the main body portion 2 and the lid portion 3.

According to the cassette eject mechanism of the present invention, since the eject operation of the cassette compartment 27 is carried out by operating the eject switch 30 in a ganged relation with the opening operation of the lid portion 3 as described above, it becomes unnecessary to dispose a cassette eject button on the surface of the housing unlike the prior art. As a consequence, it is possible to reliably prevent the tape cassette from being ejected inadvertently during the single-unit video camera-recorder is being operated.

Since the lid portion 3 is locked under the condition that it is opened at maximum, the lid portion 3 can be prevented from being closed so long as the lid portion 3 is not closed by a recklessly large force. Therefore, the tape cassette can reliably be loaded to and/or unloaded from the cassette compartment which is placed under the eject state.

Since the recording or reproducing apparatus includes the lid pop-up mechanism, the lid portion 2 is set in the popped-up state so long as the lid portion 3 is not closed completely. Therefore, it is possible to prevent the recording or reproducing apparatus from being used under the condition that the lid portion 3 remains opened.

Further, since the lid portion 3 is rotated about the hinge portion 4 in the opening direction by a large amount, it is possible to easily perform the repair and inspection, such as cleaning of the head drum and exchanging of the worn head drum or to perform repair and inspection, such as the tape path adjustment or the like without disassembling the main body portion 2 and the lid portion 3. As a consequence, it becomes possible to reduce the repair processes of the mechanical deck considerably.

While the lid pop-up mechanism is disposed on the lid portion 3 side as described above, the present invention is not limited thereto and the lid pop-up mechanism may be disposed on the main body portion 2 side.

While the cassette eject mechanism is applied to the single-unit video camera-recorder as described above, the present invention is not limited thereto and may be applied to a variety of recording and reproducing apparatus.

As described above, in the cassette eject mechanism of recording or reproducing apparatus comprising a main body portion in which a cassette compartment is incorporated and a lid portion supported to the main body portion so as to become openable and closable about a hinge portion, since the lid portion includes a pair of guide arms which assist the lid portion to be opened and closed relative to the main body portion in which a cassette eject switch is opened in a ganged relation with the opening operation of the lid portion, the cassette eject button need not be disposed on the surface of the housing of the recording or reproducing apparatus. As a consequence, it becomes possible to reliably prevent the tape cassette from being ejected during the single-unit video camera recorder is being operated.

Furthermore, since the cassette eject button is reduced, it is possible to make the recording or reproducing apparatus become easy to handle.

Figure 10:
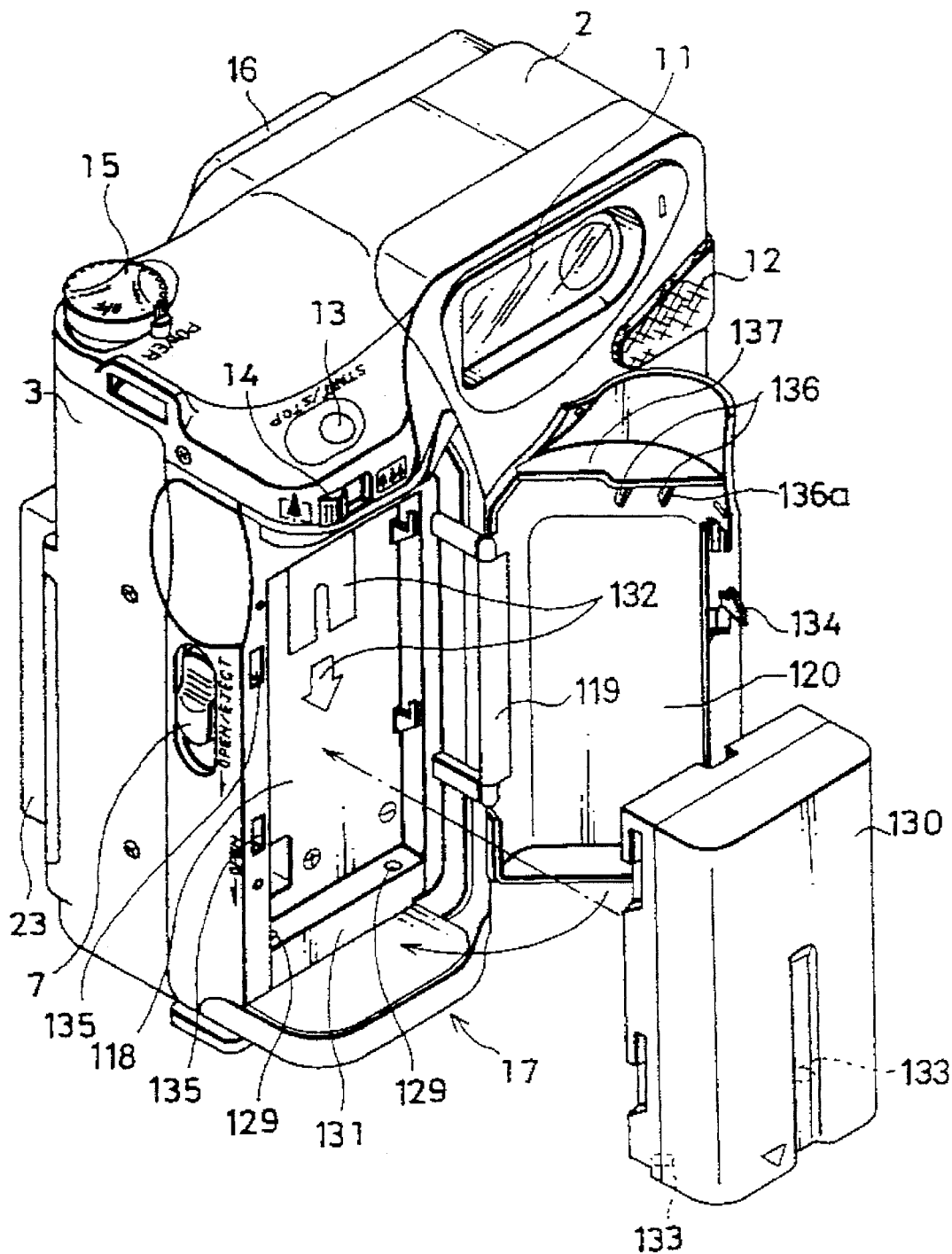
FIG. 10 is a perspective view showing a battery mechanism portion with a battery lid portion being opened according to a second embodiment of the present invention.
Figure 11:
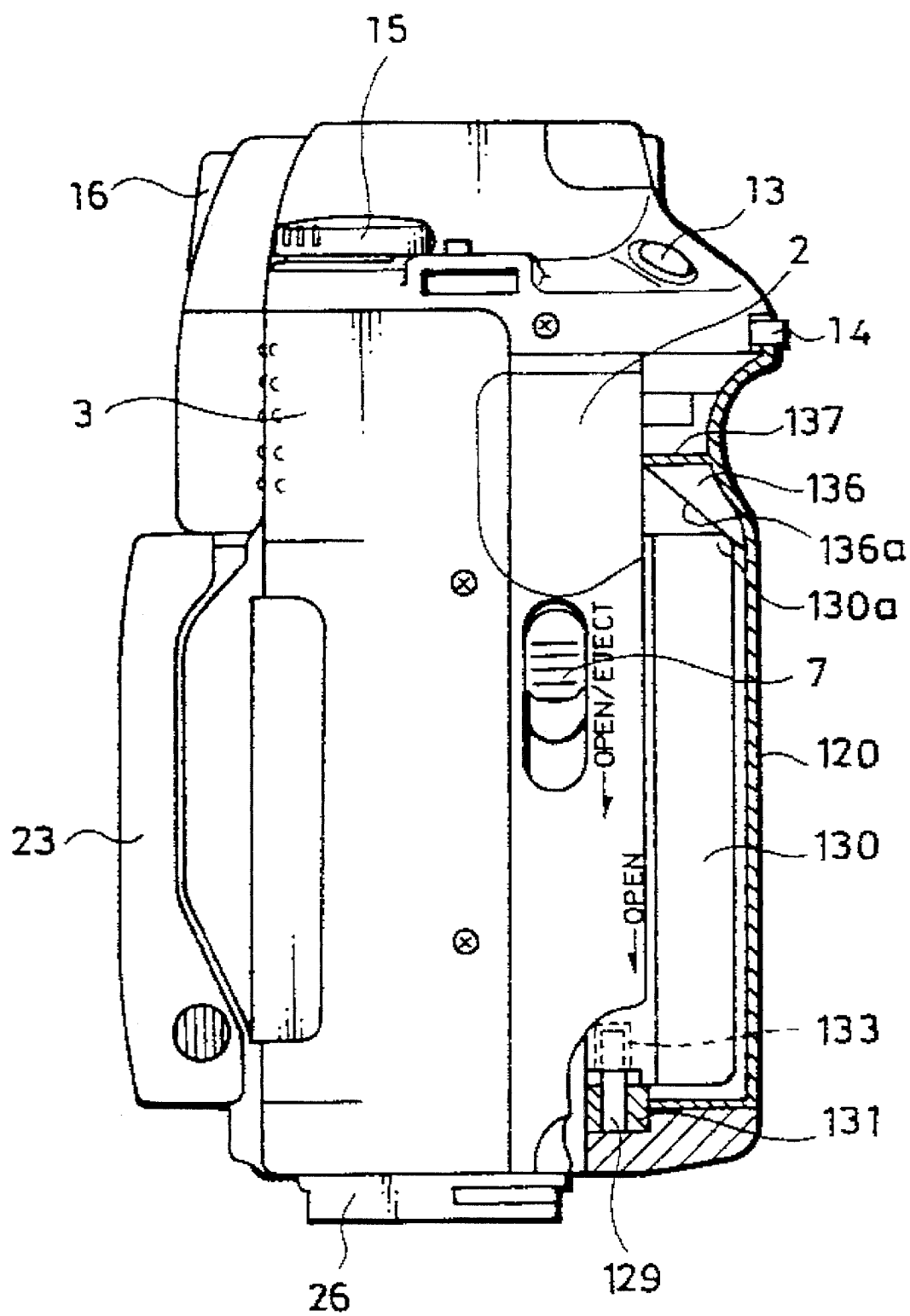
FIG. 11 is a longitudinal cross-sectional view of a single-unit video camera-recorder according to the second embodiment of the present invention under the condition that a battery thereof is attached.

A battery loading mechanism that is a main portion of a second embodiment according to the present invention will be described below with reference to FIGS. 10 and 11. In FIGS. 10 and 11, like parts corresponding to those of the first embodiment of the present invention are marked with the same references and therefore need not be described in detail.

The battery accommodating concave portion 118 is formed by forming the main body portion 2 in a concave by molding. A pair of electrode terminals 129, 129 are disposed on the lower portion of the battery accommodating concave portion 118. The electrode terminals 129, 129 are covered with a shutter member 131 which can be elevated and lowered under the spring force of a spring member (not shown) when the battery 130 is not accommodated into the battery accommodating concave portion 118. The battery accommodating concave portion 118 includes on its bottom surface marked an indication mark 132 to indicate the direction in which the battery 130 is accommodated into the battery accommodating concave portion 118.

In this embodiment, the battery 130 may be a battery pack-type battery formed of a lithium battery and therefore the battery 130 includes a pair of electrodes 133 provided on side end portions thereof.

The lid cover 120 that is supported to the main body portion 2 by means of the hinge portion 119 includes at its open end portions provided a pair of lock levers 134 (only one lock lever 134 is illustrated in FIG. 10) to become slidable by the operation of the lock releasing slide switch 21. When the lock levers 134, 134 are engaged into locking apertures 135, 135 bored through the opening portion of the battery accommodating concave portion 118, the lock levers 134, 134 are locked thereto under the condition that the lid cover 120 is in the opened state.

The lid cover 120 includes on its upper rear surface portion provided a pair of parallel ribs 136, 136 as pushing members to move the battery 130 to a proper position at which the battery 130 is loaded into the battery accommodating concave portion 118. The two ribs 136, 136 are formed integrally with a frame 137 provided on the lid cover 120 by molding. A front surface portion of each of the ribs 136, 136 is formed as an inclined surface 136a of substantially 45°. Furthermore, the ribs 136, 136 are formed at the positions distant from the hinge portion 119 of the lid cover 120.

Operation of the battery loading mechanism according to the second embodiment of the present invention will be described with reference to FIG. 11 also.

Initially, the battery 130 is accommodated into the battery accommodating concave portion 118 in accordance with the indication mark 132, and then the lid cover 120 is closed. When the lid cover 120 is being closed, the inclined surfaces 136a, 136a of the ribs 136, 136 formed on the rear surface of the lid cover 120 are brought in contact with an upper corner portion 130a of the battery 130. When the lid cover 120 is further rotated in the closing direction under this condition, the battery 130 is lowered toward the electrode terminals 129, 129 by the inclined surfaces 136a, 136a. The battery 130 is translated in the lower direction, whereby the shutter 131 is lowered against a spring force of a spring member (not shown). Consequently, at the same time when the lid cover 120 is closed and locked, the electrode terminals 129, 129 are inserted into the electrodes 133, 133 of the battery 130 to make the battery 130 and the single-unit video camera-recorder become electrically conductive. Then, the loading state of the battery 130 is completed.

As described above, according to the battery loading mechanism of the present invention, since the battery 130 can be locked at the loading position while the battery 130 can be maintained electrically conductive only by closing and locking the lid cover 120 under the condition that the battery 130 is accommodated within the battery accommodating concave portion 118, the battery 130 can be loaded reliably with ease. Therefore, the single-unit video camera-recorder becomes easy to handle considerably.

According to the present invention, since the battery loading mechanism itself can extremely be simplified in structure, the number of assembly parts can considerably be reduced with the result that the assembling cost of the single-unit video camera-recorder can be reduced and that the single-unit video camera-recorder can be made inexpensive.

Since the ribs 136, 136 are formed at the positions distant from the hinge portion 119 which becomes a supporting point at which the lid cover 120 is opened and closed, there is then the advantage that a pushing force for pushing the battery 130 by the ribs 136, 136 can be reduced when the lid cover 120 is being closed.

Further, since the upper corner portion 130a of the battery 130 is constantly urged against the inclined surfaces 136a, 136a of the ribs 136, 136 of the lid cover 120 when the lid cover 120 is closed and locked under the condition that the battery 130 is loaded into the battery accommodating concave portion 118, the battery 130 can be prevented from being loosely fitted into the battery accommodating concave portion 118. Thus, the battery 130 can be loaded into the battery accommodating concave portion 118 stably.

While the two parallel ribs 136, 136 are used as the pushing members as described above, the present invention is not limited thereto and the two ribs 136, 136 may be modified as a single thick rib having a relatively large strength. Moreover, other ribs than the pushing members may be used so long as they can be formed so as to push the battery 130.

Furthermore, while the battery loading mechanism according to this embodiment is applied to the single-unit video camera-recorder as described above, the present invention is not limited thereto and may be applied to a wide variety of battery loading mechanisms of electronic equipments, such as a recording and reproducing apparatus, a liquid crystal television receiver or the like.

As set out above, the battery loading mechanism of the electronic equipment according to the present invention includes the battery accommodating concave portion provided within the housing of the electronic equipment and the lid portion provided in the housing so as to become openable and closable to the battery accommodating concave portion about the hinge portion wherein the battery is positioned at the loading position of the battery accommodating concave portion in a ganged relation with the closing operation of the lid portion, the battery loading operation becomes reliable and easy. Thus, the battery loading mechanism according to the present invention becomes easy to handle considerably.

Moreover, the battery loading mechanism itself become extremely simple in structure and the number of assembly parts can considerably be reduced. Therefore, the assembling cost can be reduced and the apparatus can be made inexpensive.

Figure 12:
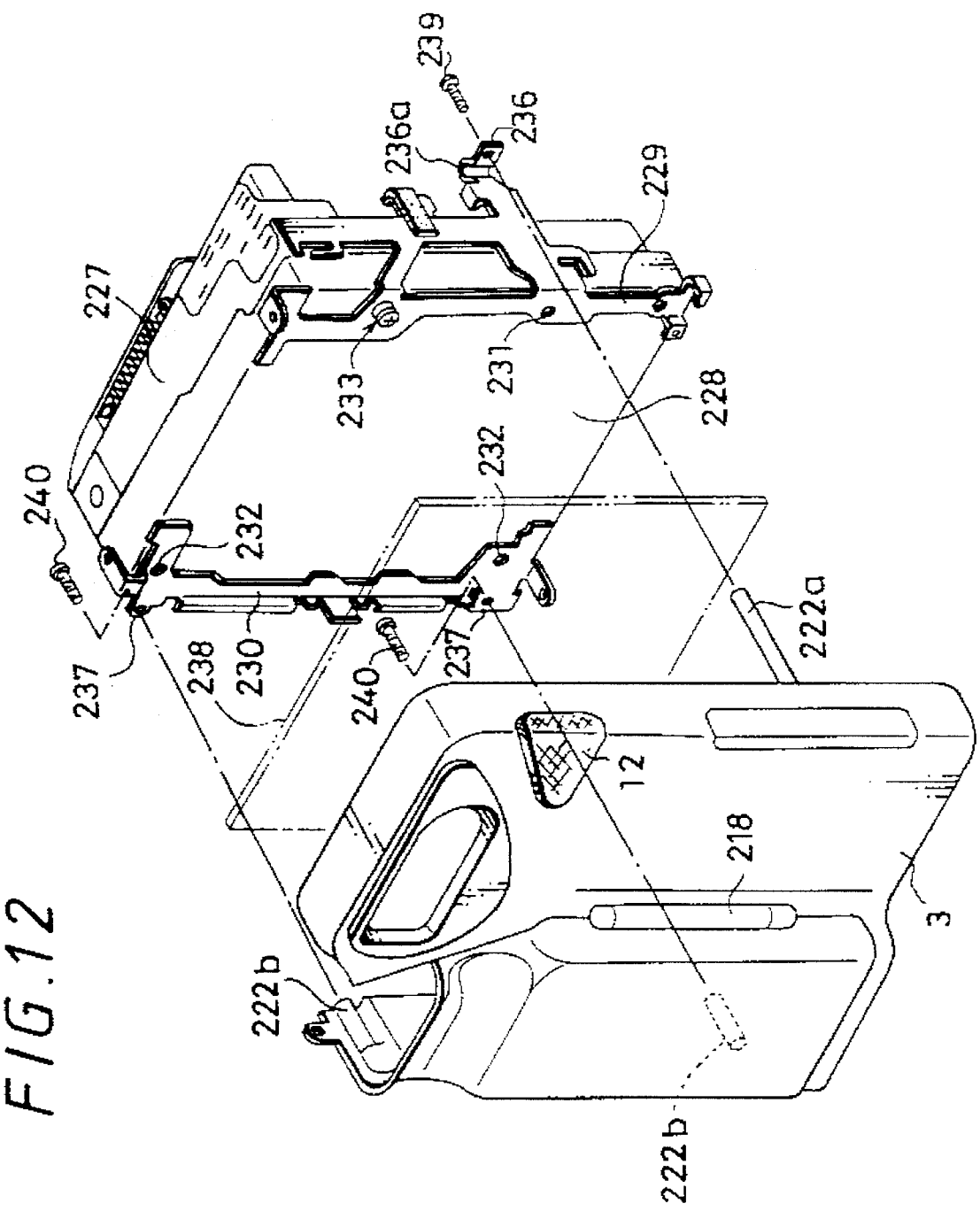
FIG. 12 is an exploded perspective view of a mechanical chassis supporting mechanism according to a third embodiment of the present invention.
Figure 13:
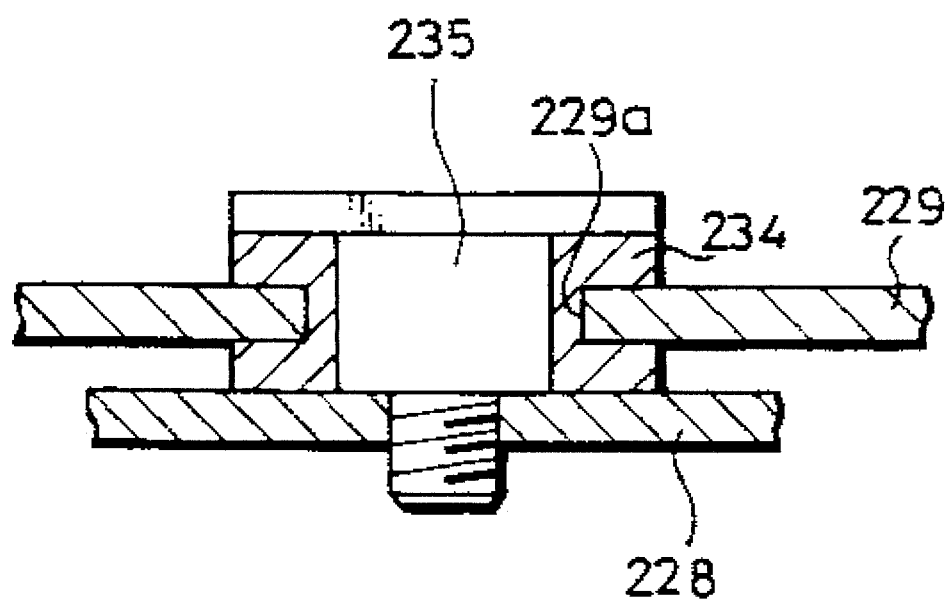
FIG. 13 is an enlarged cross-sectional view of a damper means used in the third embodiment according to the present invention.

A mechanical chassis supporting mechanism according to a third embodiment of the present invention will be described with reference to FIGS. 12 and 13. In FIGS. 12 and 13, elements and parts identical to those of the first and second embodiments of the present invention are marked with the same references and therefore need not be described in detail.

As shown in FIG. 12, the mechanical chassis 228 includes frames 229,230 secured to a drum side (not shown) and an opposite side of the drum side as supporting members in its rear surface (bottom surface) on which the cassette compartment 227 is mounted. The frame 229 on the drum side is secured to the mechanical chassis 228 by means of a single screw 231 and the frame 230 on the opposite side of the drum side is secured to the mechanical chassis 228 by means of two screws 232, 232.

The frame 229 on the drum side is supported to the mechanical chassis 228 through a damper means 233 serving as a stress absorption member provided independently of the screw 231. The damper means 233 will be described below with reference to FIG. 13. As shown in FIG. 13, the damper means 233 is formed of a silicon damper rubber 234. The silicon damper rubber 234 is fitted into and supported in a hole 229a bored through the frame 229. The damper rubber 234 is fixed at its center to the mechanical chassis 228 by way of a stepped screw 235. Thus, the frame 229 is supported to the mechanical chassis 228 via the damper rubber 234.

Referring back to FIG. 12, the frame 229 on the drum side includes a supporting member 236 having a resilient structure 236a distant from the fixed position of the screw 231 in the front and back direction but it is substantially coaxial therewith. The frame 230 on the opposite side of the drum side includes supporting portions 237, 237 near the positions at which the frame 230 is fixed to the mechanical chassis 228 by the two screws 232, 232.

Although the mechanical chassis 228 is secured to the main body portion 2 via the frames 229, 230, a printed circuit board shown by a phantom two-dot chain line 238 in FIG. 12 is secured to the rear surface of the mechanical chassis 228. A boss 222a formed on the main body portion 2 is secured to the supporting portion 236 of the frame 229 of the drum side by a screw 239. Bosses 222b, 222b formed on the main body portion 2 are respectively secured to the supporting portions 237, 237 of the frame 230 of the opposite side of the drum side by means of screws 240, 240.

According to the thus arranged mechanical chassis supporting mechanism of the present invention, since the frame 229 of the drum side is supported to the mechanical chassis 228 by the screw 231 in a one-point supporting fashion and the main body portion 2 is supported to the supporting portion 236 of the frame 229 by the screw 239 in a one-point supporting fashion, even when an external stress, such as a twisting force or the like is applied to the frame 229 from the main body portion 2 or the lid portion 3, not shown, the frame 229 is swingably moved about the supporting point 236 at which the main body portion 2 or the lid portion 3 is supported in a one-point supporting fashion. Therefore, the external stress based on the twisting force can be prevented from being applied to the mechanical chassis 228 portion of the drum side. As a result, a very small displacement can be prevented from being produced between the tape path mechanisms formed on the mechanical chassis 228 so that the tape path can be produced accurately relative to the drum.

Since the frame 229 on the drum side is fixed to the mechanical chassis 228 by means of the damper means 233 provided independently of the screw 231, the frame 229 is stably supported to the mechanical chassis 228 and the external stress, such as the twisting force or the like applied to the frame 229 can be absorbed by the damper means 233. Thus, the external stress can be prevented from being transmitted to the mechanical chassis 228.

Further, since the frame 229 includes the screw 231 secured to the mechanical chassis 28 and the supporting portion 236 for supporting the main body portion 2 and the screw 231 and the supporting portion 236 are disposed substantially coaxially, even when the frame 229 is applied with the external stress, such as the twisting force or the like from the main body portion 2, the frame 229 can swingably be moved effectively.

Furthermore, since the supporting portion 236 that supports the main body portion 2 in a one-point supporting fashion is formed as the resilient structure 236a, the external stress applied to the frame 229 from the main body portion 2 can be absorbed by the resilient structure 236a to some extent and the swing operation of the frame 229 can be suppressed to the minimum.

While the mechanical chassis supporting mechanism according to the third embodiment of the present invention is applied to the single-unit video camera-recorder by way of example, the mechanical chassis supporting mechanism of the present invention is not limited thereto and can be applied to a wide variety of recording and/or reproducing apparatus and reproducing apparatus.

As set out above, since the mechanical chassis supporting mechanism for a recording apparatus according to the present invention comprises the mechanical chassis on which the cassette compartment is mounted, the supporting members respectively supported to the drum side and the opposite side of the drum side of the mechanical chassis and the outer housing for supporting the mechanical chassis by means of the two supporting members, the supporting member on the drum side is supported to the mechanical chassis by one screw member in a one-point supporting fashion and the supporting member on the opposite side of the drum side is supported to the mechanical chassis by the two screws in a two-point supporting fashion. Therefore, the external stress, such as the twisting force or the like can be prevented from being transmitted to the mechanical chassis on the drum side and the very small displacement can be prevented from being produced between the tape path mechanisms and the accurate tape path can be produced on the drum. Therefore, the mechanical chassis supporting mechanism according to the present invention is suitable for the recording apparatus whose mechanical chassis or outer housing can be reduced in thickness in order to be miniaturized and made light in weight.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A cassette eject mechanism for a recording or reproducing apparatus comprising:

a main body portion having a cassette compartment disposed therein;

a lid portion supported to said main body portion by means of a hinge portion so as to become openable and closable about said hinge portion;

a pair of guide arms supported on said lid portion to assist said lid portion in opening and closing relative to said main body portion, wherein a cassette eject switch is disposed on a base plate provided on said main body portion such that a cassette eject button is not disposed on an exterior surface of said main body portion, said cassette eject switch being operated in a ganged relation to an opening operation of said lid portion, and wherein one of said pair of guide arms applies a force to said cassette eject switch to actuate said cassette eject switch.

2. A cassette eject mechanism for a recording or reproducing apparatus according to claim 1, wherein one of said pair of guide arms includes a lock mechanism to lock said lid portion when said lid portion is in the opened state.

3. A cassette eject mechanism for a recording or reproducing apparatus according to claim 1, wherein said lid portion includes a lid pop-up mechanism.

4. A cassette eject mechanism for a recording or reproducing apparatus according to claim 1, wherein when said pair of guide arms are detached from the lid portion, said lid portion is opened wide to expose a drum portion of said recording or reproducing apparatus.

5. A cassette eject mechanism for a recording or reproducing apparatus according to claim 1, wherein one of said pair of guide arms includes a lock mechanism to lock said lid portion when said lid portion is in the opened state.

6. A cassette eject mechanism for a recording or reproducing apparatus according to claim 5, wherein said lid portion includes a lid pop-up mechanism.

7. A cassette eject mechanism for a recording or reproducing apparatus according to claim 6, wherein when said pair of guide arms are detached from the lid portion, said lid portion is opened wide to expose a drum portion of said recording or reproducing apparatus.

* * * * *